United States Patent [19]
McNeil et al.

[11] Patent Number: 5,790,714
[45] Date of Patent: Aug. 4, 1998

[54] SYSTEM AND METHOD FOR SCALING VIDEO

[75] Inventors: William Lloyd McNeil, Apex, N.C.; David Carl Frank, Ossining, N.Y.

[73] Assignee: International Business Machines Corporation, Armonk, N.Y.

[21] Appl. No.: 332,961

[22] Filed: Nov. 1, 1994

[51] Int. Cl.$^6$ ........................ G06K 9/32
[52] U.S. Cl. ............... 382/300; 358/451; 348/581
[58] Field of Search ..................... 382/298, 299, 382/300; 358/451; 348/581

[56] References Cited

U.S. PATENT DOCUMENTS

| | | | |
|---|---|---|---|
| 4,633,503 | 12/1986 | Hinman | 358/133 |
| 4,779,135 | 10/1988 | Judd | 348/594 |
| 4,816,913 | 3/1989 | Harney et al. | 382/47 |
| 4,885,786 | 12/1989 | Anderson et al. | 382/300 |
| 5,289,292 | 2/1994 | Osada et al. | 382/298 |
| 5,335,295 | 8/1994 | Ferracini et al. | 358/451 |

FOREIGN PATENT DOCUMENTS

| | | | |
|---|---|---|---|
| 0401058 | 12/1990 | European Pat. Off. | G06F 15/62 |
| 0532221 | 3/1993 | European Pat. Off. | G06F 15/62 |
| 0574245 | 12/1993 | European Pat. Off. | G06F 15/62 |
| 0625761 | 11/1994 | European Pat. Off. | G06F 15/62 |
| 1253072 | 1/1990 | Japan | G06F 15/66 |

*Primary Examiner*—Leo Boudreau
*Assistant Examiner*—Christopher S. Kelley
*Attorney, Agent, or Firm*—Steven B. Phillips

[57] ABSTRACT

Scaling of video is performed using area weighted averaging of input pixels to calculate coefficients to multiply with luminescence and crominence of input pixels. Such coefficients are produced for both the vertical and horizontal scaling directions of the input video stream. When scaling down or scaling up, scaling is first performed in the vertical direction to produce partially scaled pixels, which are then utilized for scaling in the horizontal direction. When scaling up, a pre-interpolation or pre-replication process is utilized to double the inputted pixel grid which doubled pixel grid is then utilized to scale down to the desired pixel grid size, which is greater than the originally inputted pixel grid size.

18 Claims, 15 Drawing Sheets

(i)

(ii)

(iii)

(iv)

(v)

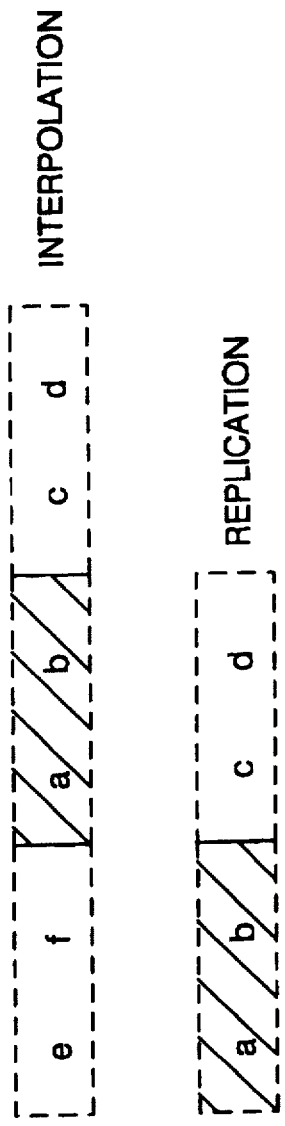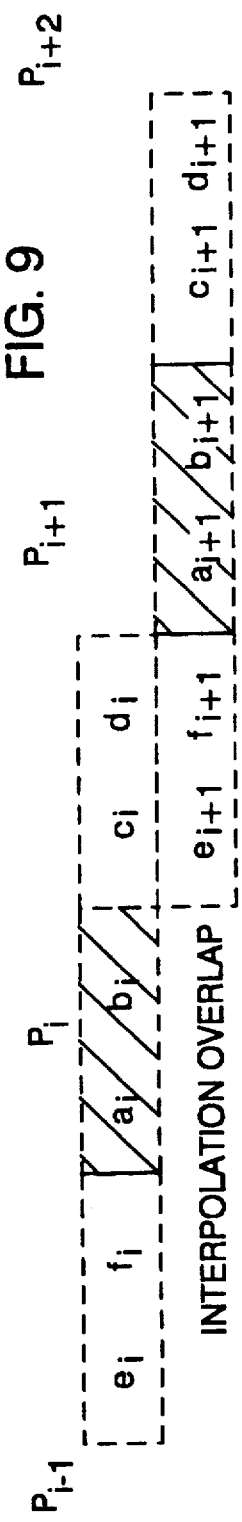
FIG. 7
FIG. 8
FIG. 9

*mH, mV ARE CONSTANTS = 256.

SYSTEM AND METHOD FOR SCALING VIDEO

TECHNICAL FIELD OF THE INVENTION

This invention relates in general to data processing systems, and, in particular, to scaling of video in a data processing system.

BACKGROUND OF THE INVENTION

A rapidly emerging multi-media application in the personal computer arena is the joint display of full-motion video along with conventional graphic applications. For example, a user may wish to display a window of video (from a VCR or camera) along with a window containing a spreadsheet application. Users of currently available graphical-user interface (GUI) operating systems expect to be able to re-size the video window to any arbitrary size, and expect the horizontal and vertical dimensions of the window to be fully independent. They may want the window to be very small, so that they can glance at it while working on another application, or they may want it to be full-screen size so that it is the focus of their attention.

The source of this video may be a "live" image from a device such as a camera or VCR, or it may be a decompressed image from a software or hardware decompressor. In any case, the video source will be a fixed size (160 horizontal pixels by 120 vertical pixels, for example). For the reasons indicated above, the user will want to be able to re-size (scale) the video stream to match the desired window size on the display (640 horizontal pixels by 480 vertical pixels, for example). The input stream may be smaller than the desired output size (scale-up needed), or it may be larger than the desired output size (scale-down needed). This need to be able to scale a video stream to an arbitrary larger or smaller size is the problem that this invention solves.

SUMMARY OF THE INVENTION

It is an objective of the present invention to provide an improved system and method for scaling a video image by generating coefficients in both the vertical and horizontal directions as a function of an area weighted average of the contributions of input pixels to output pixels in both the vertical and horizontal directions and as a function of a scaling ratio of input pixels to output pixels in both the vertical and horizontal directions, then multiplying inputted pixels of a video image with the coefficients generated in the vertical direction as a function of an area weighted average of contributions of input pixels to output pixels in the vertical direction and this multiplying step resulting in vertically scaled pixels, and then multiplying these vertically scaled pixels by the coefficients generated in the horizontal direction resulting in vertically and horizontally scaled pixels.

The present invention performs a scaling up function by essentially logically doubling the inputted pixel image through either interpolation or duplication and then scaling down this logically scaled-up image to the desired pixel grid size using the above described technique.

The present invention preferably performs the scaling down and scaling up functions in both the vertical and horizontal directions independently.

A preferred embodiment of the present invention is implemented in a data processing system including a processor, a storage device, and an input/output means including a display device.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 7 illustrates pre-replicated and pre-interpolated pixel streams;

FIG. 8 illustrates logical pixel coefficients for pre-replication and pre-interpolation;

FIG. 9 illustrates overlap of logical pixels in pre-interpolation;

DETAILED DESCRIPTION OF A PREFERRED EMBODIMENT OF THE INVENTION

In the following description, numerous specific details are set forth such as specific word or byte lengths, etc. which provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Area Weighted Averaging

In a video scaling down process, an array of pixels is mapped onto a smaller array. The idea of a weighted average scaling scheme is for the output image to contain a good representation of the original (input) image, and to do so, the luminance and chromaticity of each area in the input image is represented in the same proportion in the output image.

Weighted Average

Equation 1 shows the weighted average of two values, $X_1$ and $X_2$. $X_1$'s coefficient, or weight, is $w_1$; $X_2$'s coefficient is $w_2$. The weighted average of these two variables is their weighted sum divided by the sum of the weights.

$$WA = \frac{w_1 \cdot X_1 + w_2 \cdot X_2}{(w_1 + w_2)} \quad (1)$$

And in general, for n values $$WA = \frac{\Sigma w_i \cdot X_i}{\Sigma w_i} \quad (2)$$

This general framework can be applied to scaling pixel images. In Area Weighted Averaging a scaled (output) pixel is formed by averaging input pixels, each weighted by the area of the input pixel which contributes to the output pixel. Given a regular m×m pixel grid Q, overlay an n×n pixel grid P where n<m. For each pixel $Q_j$ in the n×n array compute a weighted average of the underlying pixels $P_i$ from the m×m array. The weighting coefficients of the calculation are proportional to the area of the m×m pixel grid overlaid by the pixel from the n×n grid.

$$Q_j = \frac{1}{N} \sum_i w_i \cdot P_i \quad (3)$$

For this discussion, assume a gray level image with each pixel in the range 0–R (e.g., 0–255). The algorithm and the present invention is easily generalized in color. The algorithm manipulates the luminance of pixels. For now, assume isotropic scaling; later it will be generalized to non-isotropic scaling. Scaling will be in fixed integer ratios.

Image Scaling with Area Weighed Averaging

Figure 1:
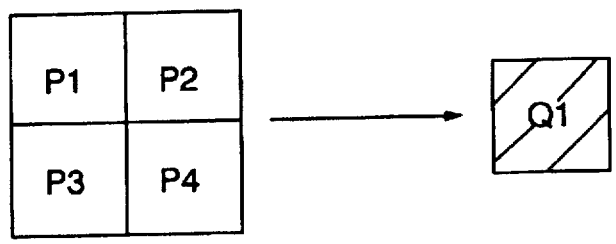
FIG. 1 illustrates a representational scheme for scaling down a ratio or 2:1.

Referring to FIG. 1, shown is an example wherein in scaling down 2:1 each output pixel $Q_1$ is formed by averaging 4 input pixels ($P_1$, $P_2$, $P_3$, $P_4$).

$$Q_1 = \frac{P_1 + P_2 + P_3 + P_4}{4} \quad (4)$$

In this case all input pixels are weighted identically. When the scale factors are not evenly divisible, weighting coefficients vary, being proportional to the area of the input pixel that contributes to an output pixel.

Figure 2:
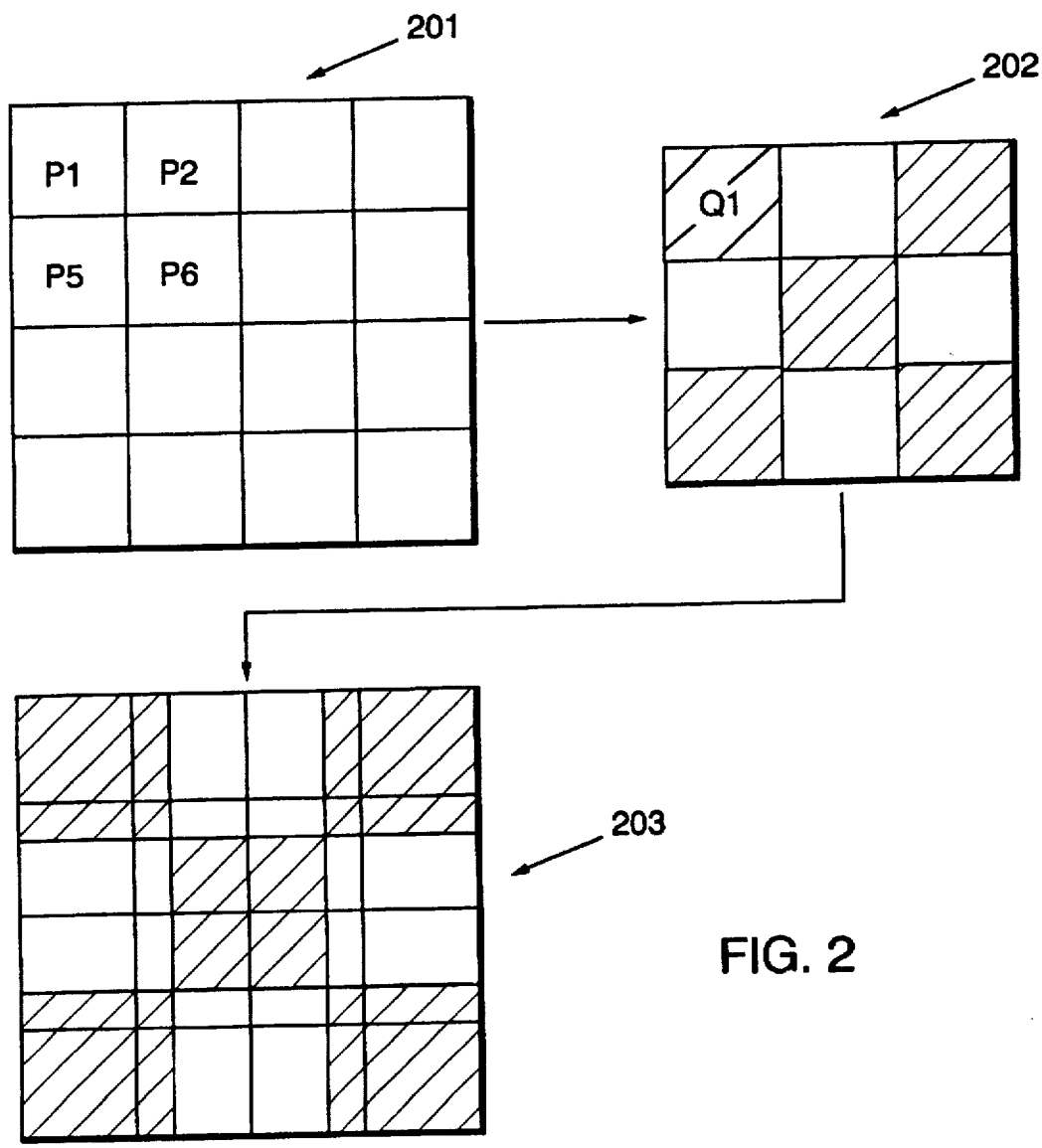
FIG. 2 illustrates a representational scheme for scaling down 4:3.

FIG. 2 shows 4×4 input pixel array 201 and 3×3 output pixel array 202. In this example, 4×4 pixel array 201 is being scaled down to 3×3 pixel array 202. Graphic 203 shows the way this problem is visually represented. Here, 4×4 grid 201 is overlayed by 3×3 grid 202, with alternate pixels shaded in the output array 202. In this representation, the sizes of the output pixels look larger than the sizes of the input pixels, but this is an artifact of the representational scheme. This representation is used to clearly show how more than one input pixel contributes to the information in one output pixel.

This weighted average is shown in the first line of the next set of equations. $Q_1$ is the weighted average of the contributing input pixels, normalized so that the output pixel luminances are in the same range (R), as the input pixel luminances. The coefficients in the numerator are proportional to the area. The denominator is a constant which normalizes the sum. The following equations convert the fractional area weights (e.g., ½, ¼) into a form with lower computational complexity. It is this form of the weighted average calculation that will be used in later discussions. The weighting coefficients, of course, depend on the scaling factor.

$$Q_1 = \frac{1 \cdot P_1 + \frac{1}{3} \cdot P_2 + \frac{1}{3} \cdot P_5 + \frac{1}{9} \cdot P_6}{16/9} \quad (5)$$

$$= \frac{9}{16} \cdot P_1 + \frac{3}{16} \cdot P_2 + \frac{3}{16} \cdot P_5 + \frac{1}{16} \cdot P_6$$

$$= \frac{1}{16} \cdot (9 \cdot P_1 + 3 \cdot P_2 + 3 \cdot P_5 + 1 \cdot P_6)$$

Scaling in One Dimension

Figure 3:
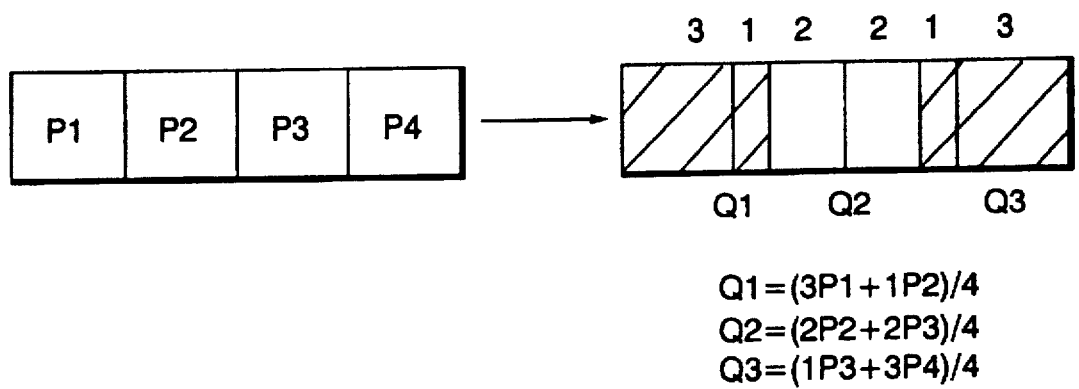
FIG. 3 illustrates a representational scheme for scaling down 4:3 in one dimension.

In FIG. 3, there is shown a one-dimensional mapping of four pixels to three. Each output pixel, thus, is computed by calculating the weighting coefficients of the contributing input pixels. These coefficients can be derived from a Linear Congruent Sequence. Equation 6 shows the general form of the Linear Congruent Sequence.

$$X_{i+1} = (a \cdot X_i + b) \bmod c \quad (6)$$

This representation, however, by definition restricts the range of the values from 0 to c−1. To change the range of the values, a variation on this sequence has been developed, so that the values can range from 1 to m. In this application, m and n are the scale factors. In scaling down an image, scale from m to n (e.g., from 4 to 3).

$$Z_{i+1} = (Z_i - b) \bmod c \quad (7)$$

where b=(n) and c=m and $Z_i = (m - X_i)$

This equation generates a series of terms from which can be derived the weighting coefficients for each input pixel. This form of the Linear Congruent Sequence is called the Z sequence. The Z sequence is a function of m and n. Consider, for example, the Z sequence for scaling from m=4 to n=3:

Z(4:3)=4 1 2 3 4 1 2 3 4 . . .

from which the following coefficient pair sequence can be generated:

(3,0 1,2 2,1 3,0 3,0 1,2 2,1 3,0 3,0 . . . ).

The minimum non-repeating length of the Z sequence is given by $$L = \frac{LCM(m,n)}{n} \quad (8)$$

wherein LCM (m,n) is the least common multiple of m and n.

Weighting coefficients can be directly calculated from the Z values by the following:

$$C1 = \begin{cases} Z_i & \text{for } Z_i < n \\ n & \text{for } Z_i \geq n \end{cases} \quad (9a)$$

$$C2 = n - C1 \quad (9b)$$

The algorithm uses the Z value as a decision variable in generating the weighting coefficient pair, C1, C2. It will also be necessary to know how the input pixel is aligned with the output pixel(s)—whether this pixel begins a new output pixel (PB), ends an output pixel (PE), or is split between two output pixels (PS) finishing one output pixel and beginning another. These flags are also derived from the Z decision variable. These flags are used to steer the weighting calculation. The Z algorithm therefore supplies all the information needed to perform the area weighted averaging calculation.

$PB \leftarrow Z_i = m$ $PS \leftarrow Z_i - n < 0$ \hfill (10)

$PE \leftarrow Z_i - n = 0$

Figure 4:
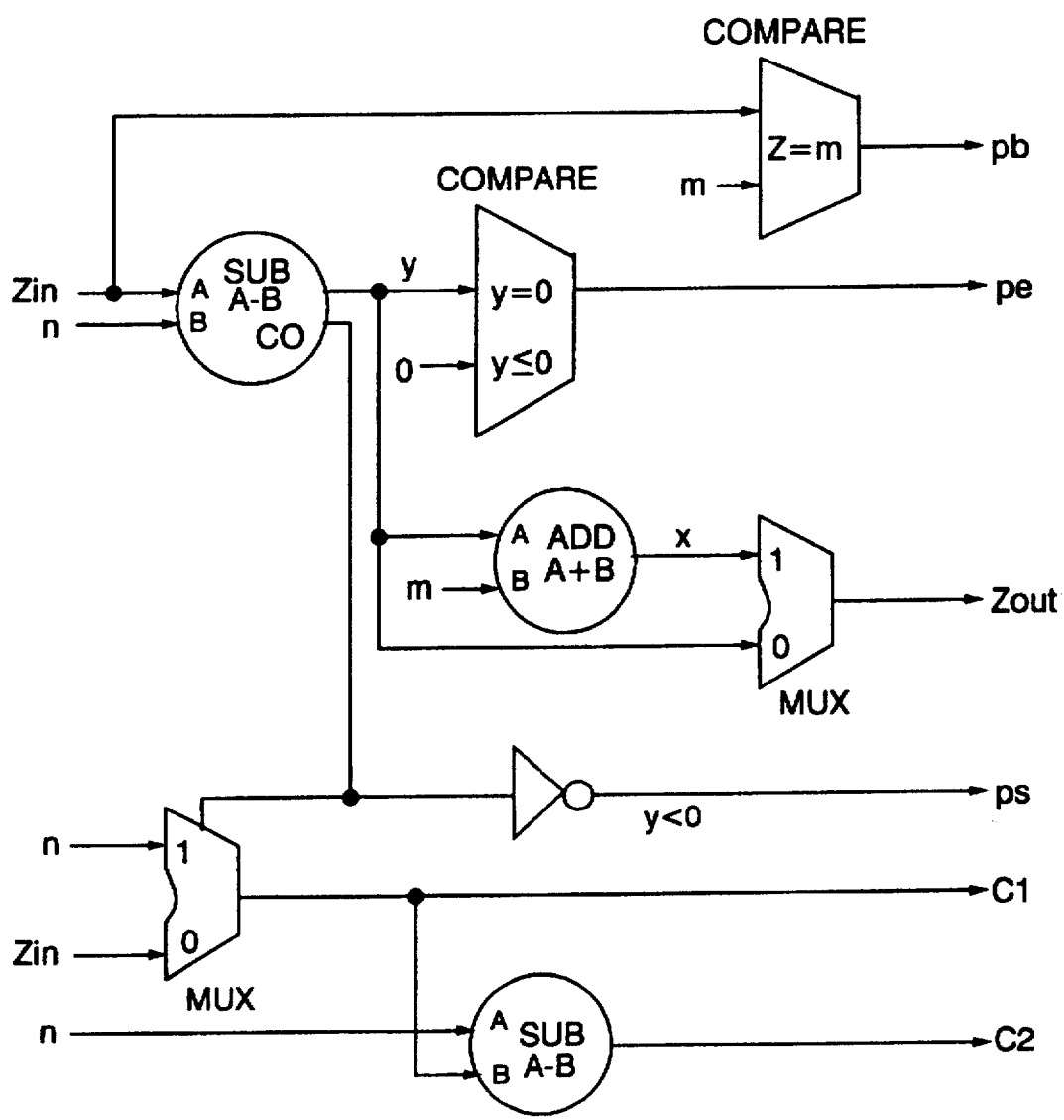
FIG. 4 illustrates a logical block diagram of a Z-Engine.

For an overview of the implementation of the Z-Engine, refer to FIG. 4. The inputs to the Z-Engine are the required scale factor and the previous Z decision variable Zin. The outputs of the Z-Engine are two weighting coefficients (C1 and C2), three pixel alignment flags (PB, PS, PE), and the next Z decision variable Zout. The Z-Engine implements Equations 7, 9a, 9b and 10.

Application To Rasterized Video
The Area Weighted Averaging Calculation

In a real-time sampled environment, the form of Equation 3 is not appropriate. In Equation 3, a single output pixel, $Q_j$, is computed as a function of multiple input pixels, $P_i$. In the rasterized environment, however, the multiple P's are not available simultaneously. Because the information is scanned, line by line, the information is available as a continuous string of Ps. In the sampled environment, the algorithm must handle each input pixel, P, once and only once. Thus, instead, each input pixel's contributions to those output pixels it influences are calculated.

Figure 5:
FIG. 5 illustrates various scale down pixel overlay cases.
Figure 5:
Figure 5:
Figure 5:
Figure 5:

Referring next to FIG. 5, in one dimension, when scaling down, there are four ways for a given input pixel to map onto the output pixel stream. An input pixel can begin a new output pixel (i), contribute to a pending output pixel (ii), finish an output pixel (iii), or can be split between two output pixels, finishing one and beginning a second (iv). In addition, in the pass through case (scaling 100%) each input pixel is mapped 1:1 to each output pixel (v).

The Z-Engine generates two coefficients (C1,C2); the weighting calculation generates two partial pixel weightings (K9,K10) from these coefficients and the input pixel.

$[K1 \; K2] = [C1 \; C2] \times P_i$ \hfill (11)

Since at most one input pixel can contribute to two output pixels (finishing one and beginning another), the following accumulation algorithm (Equations 12–15) requires a single pending accumulator (A) and a single result accumulator (Q'). The one-dimensional accumulation algorithm is steered by the pixel alignment flags (PB, PS, PE). A valid completed pixel is indicated by the valid flag.

$Q' = \begin{cases} K1 + A & \text{if } \overline{PB} \\ K1 & \text{otherwise} \end{cases}$ \hfill (12)

$A = \begin{cases} K2 & \text{if } PS \\ K1 + A & \text{else if } \overline{PB} \\ K1 & \text{otherwise} \end{cases}$ \hfill (13)

Valid = $PS|PE$ \hfill (14)

$Q = \dfrac{Q'}{N}$ \hfill (15)

PS|PE is the logical or of the pixel split (PS) and pixel end (PE) flags. N is the factor to normalize the result to the input range. Q' is the result accumulator (before normalization) and A is the pending accumulator. $\overline{PB}$ is the logical not of the pixel begin flag (PB).

Extension to Two Dimensions

While it is possible to generate weighting coefficients and perform the weighting computation in two dimensions directly, when the algorithm is later extended to scaling up it is more compact to perform the scaling in each dimension separately in two stages. Pixels are first processed vertically, then the vertically weighted pixels are passed on to be scaled horizontally.

For each dimension a separate Z-Engine is needed. The horizontal Z-Engine will iterate for each pixel on a line, resetting at horizontal retrace. The vertical Z-Engine will iterate for each line of a field, resetting at vertical retrace. The two Z-Engines will generate separate weighting coefficients ($C1_V$, $C2_V$ and $C1_H$, $C2_H$) and separate pixel alignment flags ($PB_V$, $PS_V$, $PE_V$ and $PB_H$, $PS_H$, $PE_H$). Note that for all pixels on a given input line, the vertical coefficients and flags are constant.

To perform the vertical computation it is necessary to save and accumulate partial pixel data for each pixel of an input line, requiring a one line cache as wide as the widest input pixel line. The cache is a vertical accumulator for each input pixel. The vertical section performs the vertical weighting calculation (Equation 11), retrieves pending partial pixel data from the cache (R), stores updated partial pixel data back to the cache (W), and passes finished (vertically) pixels ($P_V$) on to the horizontal section. Note that for input lines which are split between two output lines ($PS_V$) the cache is both read and written for each input pixel on that line.

$[K9 \; K10] = [C1_V \; C2_V] \times P_i$ $P_V = \begin{cases} K9 + R & \text{if } \overline{PB_V} \\ K9 & \text{otherwise} \end{cases}$ \hfill (16)

$W = \begin{cases} K10 & \text{if } PS_V \\ K9 + A & \text{else if } \overline{PB_V} \\ K9 & \text{otherwise} \end{cases}$ \hfill (17)

$\text{Valid}_V = PS_V|PE_V$ \hfill (18)

The horizontal section accepts completed pixels from the vertical section ($P_V$), performs the weighting calculation, and outputs valid normalized, completed pixels.

$[K1 \; K2] = [C1_H \; C2_H] \times P_V$ \hfill (19)

$Q' = \begin{cases} K1 + A & \text{if } \overline{PB_H} \\ K1 & \text{otherwise} \end{cases}$ \hfill (20)

$A = \begin{cases} K2 & \text{if } PS_H \\ K1 + A & \text{else if } \overline{PB_H} \\ K1 & \text{otherwise} \end{cases}$ \hfill (21)

$Q = \dfrac{Q'}{N_H}$ \hfill (22)

$\text{Valid}_Q = \text{Valid}_V \; \& \; \text{Valid}_H = (PS_V|PE_V) \; \& \; (PS_H|PE_H)$ \hfill (23)

Figure 6:
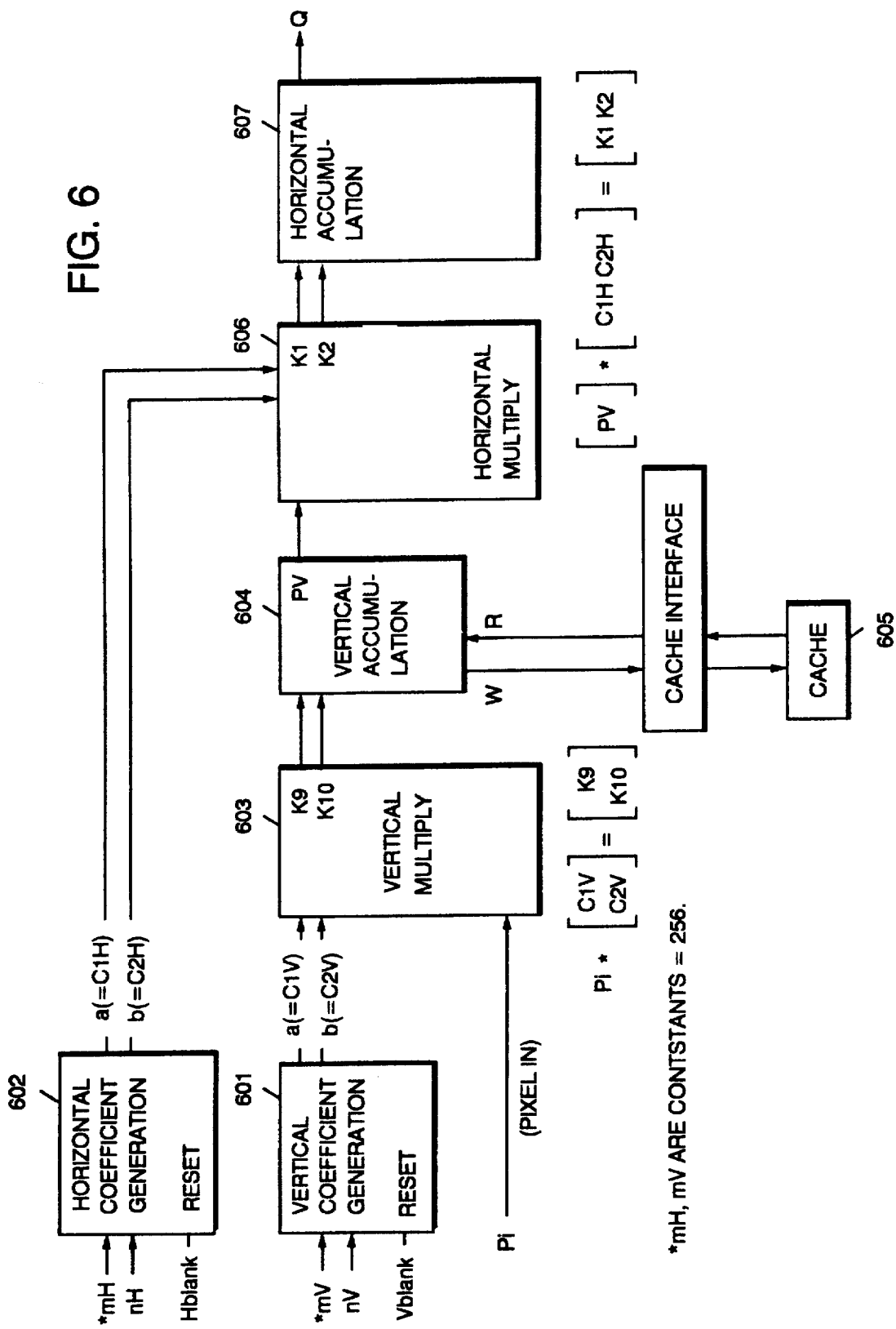
FIG. 6 illustrates a hardware configuration for scaling down video.

FIG. 6 shows an overview of the Scale-Down architecture. This diagram shows the data flow for the algorithm for scaling down. Inputs are the horizontal and vertical scale factors (mH, nH, mV, nV) and the pixel input stream Pi. For each line of the input Pi , vertical coefficient generator 601 generates two vertical weighting coefficients ($C1_V$ and $C2_V$) and the relevant vertical pixel alignment flags as described with respect to the Z-Engine illustrated in FIG. 4. For each pixel on this line, horizontal coefficient generator 602 generates two horizontal weighting coefficients ($C1_H$ and $C2_H$) and the relevant horizontal pixel alignment flags as described with respect to the Z-Engine illustrated in FIG. 4. The incoming pixel Pi is first multiplied in vertical multiply circuit 603 by the two vertical weighting coefficients to generate two partial pixels K9, K10 (Equation 11). Vertical accumulator 604, steered by the alignment flags combines these with pending partial pixel data from cache 605 (if any) and then updates the cache (if necessary) with pending data for the next line and passes the vertically completed pixel (PV) data to the horizontal section (Equations 16–18). This data is then multiplied in horizontal multiply circuit 606 by the two horizontal weighting coefficients to generate two more partial pixels K1, K2 (Equation 19). Horizontal accumulator 607, steered by the horizontal alignment flags, combines these with its pending partial pixel data (if any), stores pending data (if necessary) and when finished, outputs a completed output pixel Q (Equations 20–23).

Scaling Up

Scaling Up Strategies

Two strategies are employed for scaling up based on the idea of first doubling the input pixel stream to 200% and then applying the scale down algorithm. This pre-doubling can be via either simple replication or linear interpolation. Actually doubling the data stream (in two dimensions) would require four times as many computations; instead we logically double the data building the pixel interpolation or replication into the coefficient generation.

We distinguish between logical input pixels which are never actually generated in the algorithm and the real input pixels which are operated on by the algorithm.

For example, (in one dimension) scaling up to 150% would be equivalent to doubling 2 pixels to 4 and then scaling the 4 intermediate pixels to 3, which is referred to as 2:4:3 scaling. Equations 24a–c show the weighting calculation of scaling the pre-interpolated pixels; Equations 25a–c show the weighting calculation after moving the interpolation into the coefficients.

$$Q_1 = \frac{3}{4} \cdot P_1 + \frac{1}{4} \cdot \frac{P_1 + P_2}{2} \quad (24a)$$

$$Q_2 = \frac{2}{4} \cdot \frac{P_1 + P_2}{2} + \frac{2}{4} \cdot P_2 \quad (24b)$$

$$Q_3 = \frac{1}{4} \cdot P_2 + \frac{3}{4} \cdot \frac{P_2 + P_3}{2} \quad (24c)$$

Moving the interpolation into the weighting coefficients $$Q_1 = \frac{7}{8} \cdot P_1 + \frac{1}{8} \cdot P_2 \quad (25a)$$

$$Q_2 = \frac{2}{8} \cdot P_1 + \frac{6}{8} \cdot P_2 \quad (25b)$$

$$Q_3 = \frac{5}{8} \cdot P_2 + \frac{3}{8} \cdot P_3 \quad (25c)$$

Generating Coefficients

The scaling down algorithm examines one input pixel at a time. For scaling up with pre-replication (in one dimension) we must evaluate two logical pixels for each input pixel; the actual input pixel and the replicated pixel. For scaling up with pre-interpolation we must evaluate three logical pixels for each input pixel; the actual input pixel and the two adjacent interpolated pixels. FIG. 7 shows logical pre-interpolated and pre-replicated pixel streams.

The Z algorithm generates two coefficients for each logical input pixel. For pre-replication, with two logical pixels this is a total of four coefficients for each input pixel. For pre-interpolation this is a total of six coefficients. FIG. 8 shows a naming convention for these coefficients, which is utilized hereinafter.

Whereas for scale down and scale up with pre-replication there is no information overlap between logical pixels, with pre-interpolation each logical interpolated pixel overlaps with the next interpolated pixel (FIG. 9). Note that the coefficients e and f are identical to the previous pixel's c and d coefficients.

Figure 10:
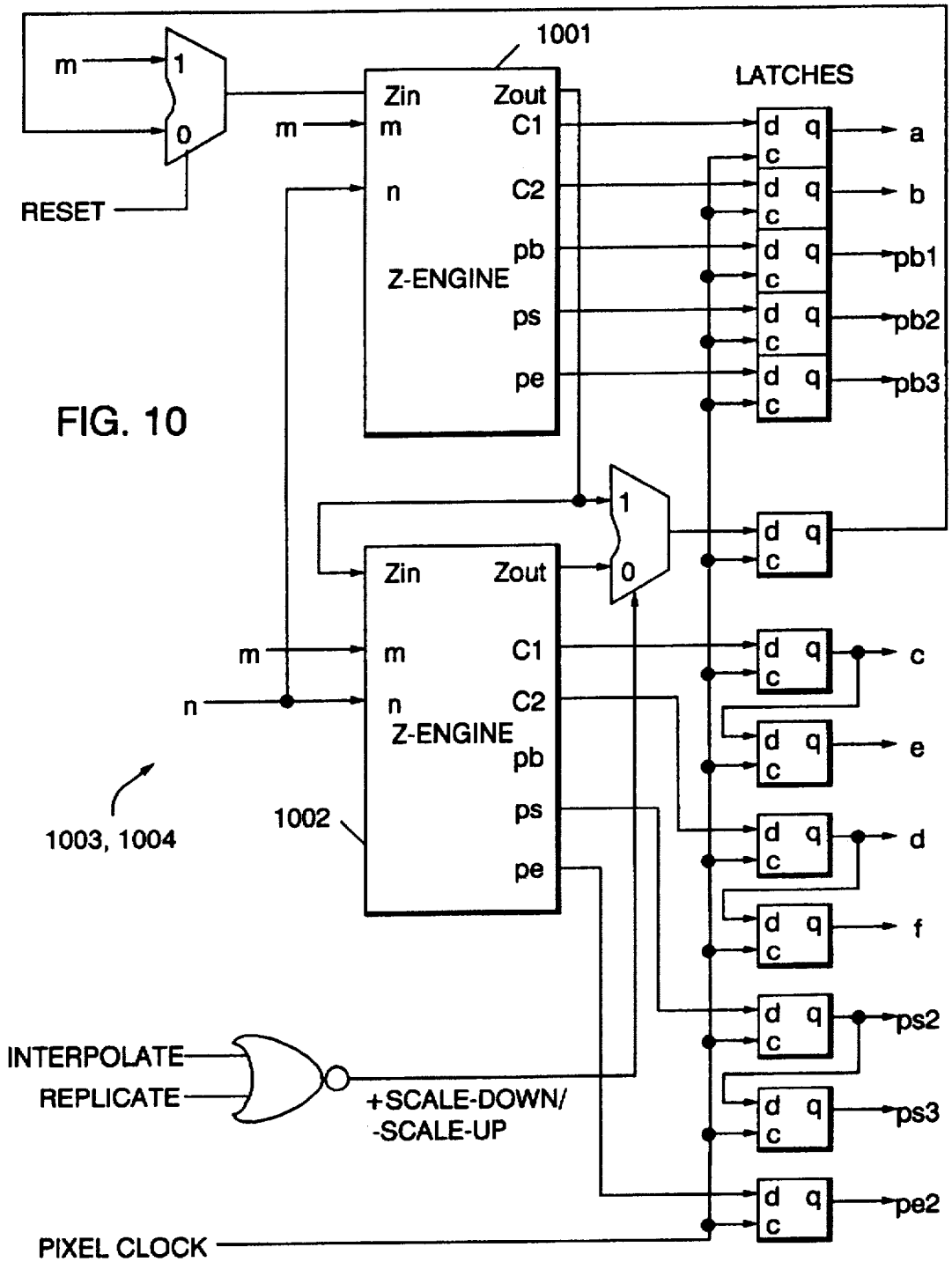
FIG. 10 illustrates coefficient generation with two chained Z-Engines.

Referring to circuitry 1003, 1004 in FIG. 10, to generate the coefficients for pre-replication and pre-interpolation two chained Z-Engines 1001, 1002 (similar to the one in FIG. 4) are used which together iterate once for each input pixel. The two Z-Engines generate two coefficients each (a,b and c,d). In addition, the previous c,d values are saved as the next pixel's e, f coefficients. The inputs on the left are the scale factor term n, the $Z_0$ initial Z value and the inherited Z value of the previous pixel ($Z_{i-1}$). When scaling down, Z-Engine 1002 and the entire lower section is not utilized. When scaling up, the output Z value of Z-Engine 1001 is passed to Z-Engine 1002; the output Z value of Z-Engine 1002 is the value used as $Z_{i-1}$ for the next pixel. Each Z-Engine 1001, 1002 generates a pair of coefficients and a set of alignment flags. In addition, there are latches to copy c,d and $PS_2$ to e, f and $PS_3$.

Z-Engine 1001 generates the coefficients a,b and the flags $PB_1, PS_1, PE_1$. Z-Engine 1002 generates the coefficients c,d and the flags $PB_2, PS_2, PE_2$. For pre-interpolation the coefficients e, f are inherited from the previous pixel's c,d coefficients and $PS_3$ is inherited from the previous pixel's $PS_2$ flag. (For pre-interpolation $PE_3$ is not required and the $PB_3$ is trivially equal to $PB_2$.)

Figure 11:
FIG. 11 illustrates pre-replication overlay cases in one dimension.

Referring to FIG. 11, in one dimension, when scaling up via pre-replication, there are six ways for a given input pixel to map onto the output pixel stream. An input pixel can map to a completed output pixel and begin a second pending output pixel (i); finish a pending output pixel and begin a second pending pixel (ii); and (iii); finish a pending output pixel and complete a second pixel (iv); finish a pending output pixel, map to a second completed pixel and begin a third pending pixel (v); and be mapped to two output pixels in the 200% case (vi).

Figure 12:
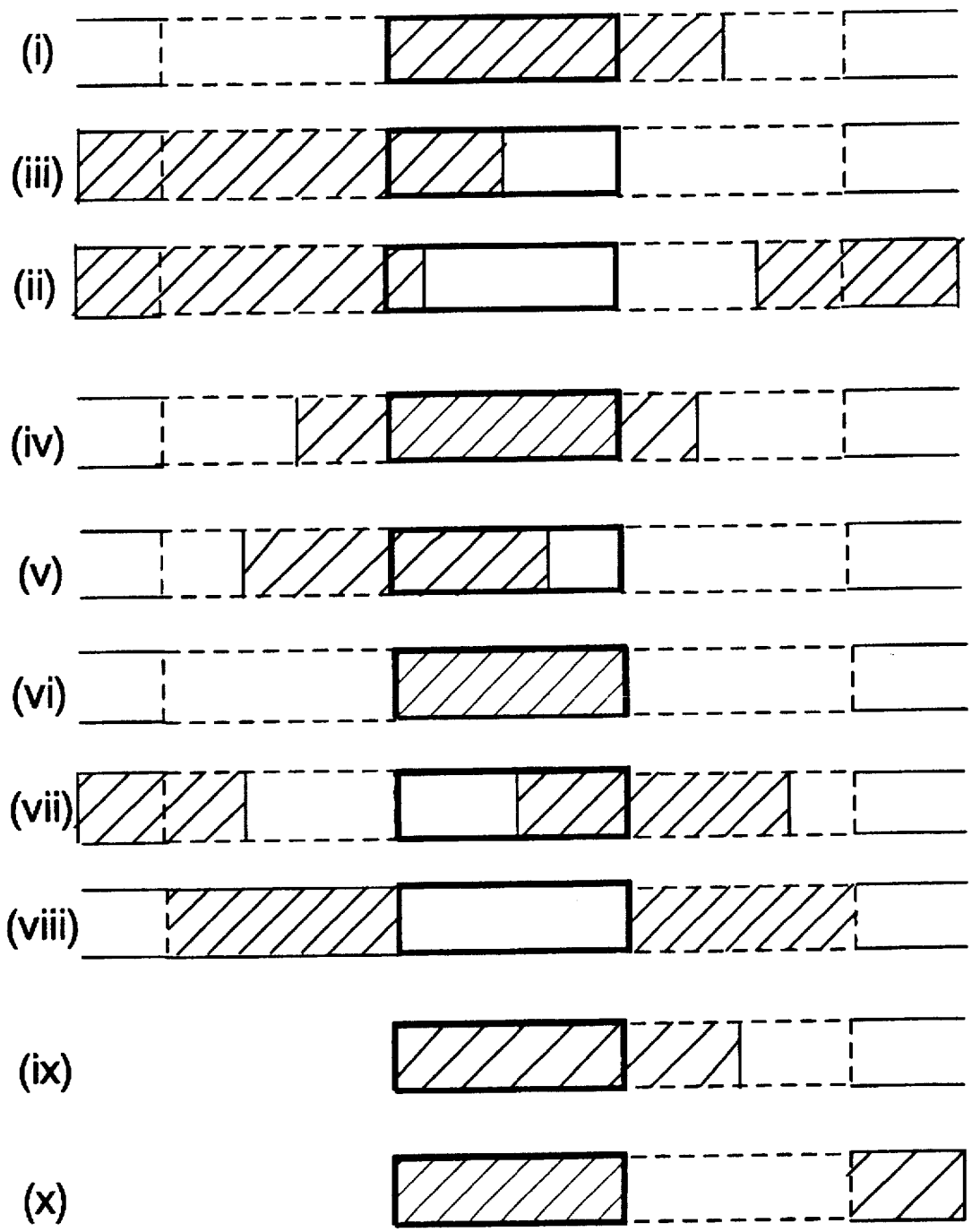
FIG. 12 illustrates pre-interpolation overlay cases on one dimension.

Referring to FIG. 12, in one dimension, when scaling up via pre-interpolation, there are eight ways for a given input pixel to map onto the output pixel stream. An input pixel can finish an output pixel, and begin two pending pixels (i), (iii) and (iv); finish an output pixel and begin one pending output pixel (ii); finish two pending output pixels and begin one pending output pixel (v); finish two pending output pixels and begin two pending output pixels (vi); and finish one pending pixel, complete a second and begin a third pending pixel in the 200% case (vii). In addition, to these basic eight cases, there are two additional boundary conditions at the edge when the previous interpolated pixel is undefined (viii) and (ix).

Coefficient Reduction

Rather than employ four or six coefficients in the weighting calculation we interpose a coefficient reduction step between the logical coefficients and the weighting calculation. This step reduces the four coefficients in pre-replication to three and reduces the six coefficients in pre-interpolation to four. Coefficient reduction combines associated logical coefficients by summing together those logical coefficients which contribute to a common output pixel. For example, in pre-replication overlay case (i): $c_1 = a + c$. The pixel alignment flags are used to determine the pixel boundaries and thus, which coefficients to sum.

$$C1 = \begin{cases} a & \text{if } PS_1|PE_1 \\ a + (b+c) & \text{otherwise} \end{cases} \quad (26)$$

$$C2 = \begin{cases} d & \text{if } (\overline{PS_1} \& PS_2) \\ (b+c) & \text{otherwise} \end{cases} \quad (27)$$

$$C3 = \begin{cases} d & \text{if } (PS_1 \& PS_2) \\ 0 & \text{otherwise} \end{cases} \quad (28)$$

The Pre-Replication Calculation

In Pre-Replication an input pixel can contribute to at most three output pixels, only one of which can be pending from a previous pixel. Therefore as in the scaling down scenario, a single pending accumulator (A) is needed. Instead of one result accumulator though, two are needed ($Q'_A$ and $Q'_B$). Each pixel is weighted by three coefficients to form three partial pixel terms:

$$[K1 \ K2 \ K3] = [C1 \ C2 \ C3] \cdot P_i \quad (29)$$

If there is a pending partial pixel (if $PB_1$ is FALSE), then it is added to K1 to form the first result accumulator ($Q_A$):

$$Q'_A = \begin{cases} K1 + A & \text{if } \overline{PB_1} \\ K1 & \text{otherwise} \end{cases} \quad (30)$$

The second result accumulator ($Q'_B$) is unconditionally loaded with K2:

$$Q'_B = K2 \quad (31)$$

The pending accumulator is loaded with either K2 or K3 depending on whether the replicated pixel contributes to two or three output pixels:

$$A = \begin{cases} K3 & \text{if } (PS_1 | PE_1) \& (PS_2 | PE_2) \\ K2 & \text{otherwise} \end{cases} \quad (32)$$

The contents of the first result accumulator ($Q'_A$) is always valid (at least one pixel is output for each input pixel when scaling up):

$$\text{Valid}_A = 1 \quad (33)$$

And, the result accumulator ($Q'_B$) is valid if:

$$\text{Valid}_B = (PS_1 | PE_1) \& (PS_2 | PE_2) \quad (34)$$

Equations 29–34 illustrate the pre-replication accumulation algorithm. Each input pixel is weighted by three coefficients generating three partial pixels (K1, K2, K3). The first result accumulator ($Q'_A$) is always valid (Equation 33); the second accumulator ($Q'_B$) is governed by Equation 34.

Generating Coefficients

To build the interpolation into the coefficients, the coefficient reduction step weights the interpolated coefficients e, f and c,d by half before combining associated coefficients.

To reduce the number of possible values an interpolation coefficient can take on we introduce coefficient combination terms. Instead of two distinct terms for a and (f/2+a) we can combine these terms into a single term taking advantage of the fact that whenever we would use just the a term, f=0. Likewise, we can combine b and (b+c/2) using just (b+c/2) whenever b is required.

$$C1 = \begin{cases} e/2 + (a + f/2) & \text{if } PS_1 \& \overline{PS_3} \\ e/2 & \text{otherwise} \end{cases} \quad (35)$$

$$C2 = \begin{cases} (b + c/2) & \text{if } \overline{PS_1} \& PS_2 \\ (f/2 + a) + (b + c/2) & \text{else if } PS_1 \& \overline{PS_3} \\ (f/2 + a) & \text{otherwise} \end{cases} \quad (36)$$

$$C3 = \begin{cases} (b + c/2) & \text{if } (PB_1 \& PE_1) | (PS_3 \& PS_1) \\ (f/2 + a) + (b + c/2) & \text{else if } PS_1 \& \overline{PS_3} \\ d/2 & \text{otherwise} \end{cases} \quad (37)$$

$$C4 = \begin{cases} d/2 & \text{if } (PS_1 \& PS_2 \& PS_3) \\ 0 & \text{otherwise} \end{cases} \quad (38)$$

Figure 13:
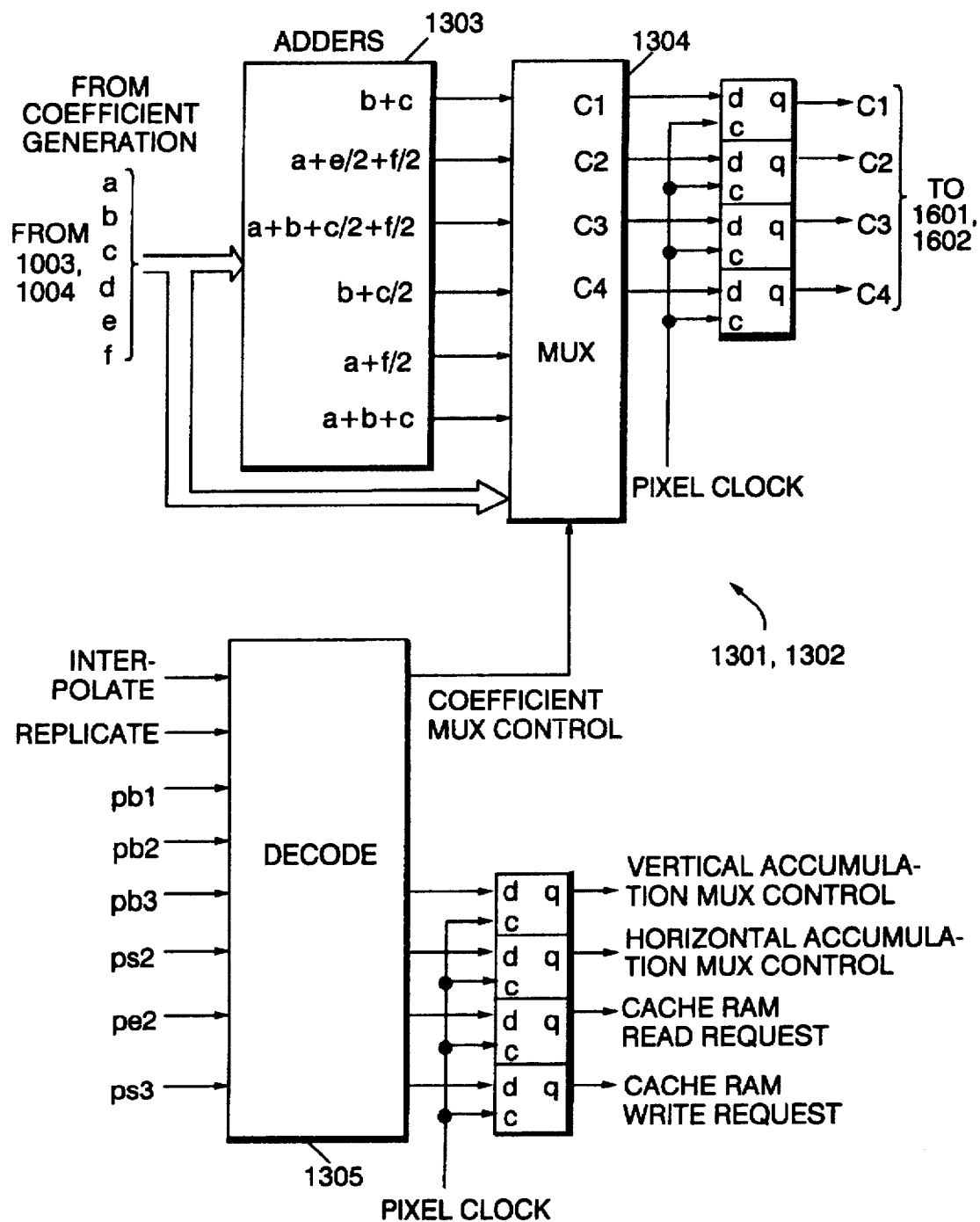
FIG. 13 illustrates a hardware configuration for coefficient interpolation/reduction.

FIG. 13 illustrates the converged coefficient interpolation/reduction block (1301, 1302). The inputs are the six coefficients a–f as described above from circuitry 1003, 1004, the current alignment flags (PB1, PB2, PB3, PS2, PE2, and PS3) and the scaling mode (scale down, scale up, pre-interpolation or scale up pre-replication). A series of adders 1303 forms the required coefficient terms (e.g., b+c, a+f/2, etc.) and four multiplexors 1304 select the appropriate values for C1, C2, C3 and C4. The operations of adders 1303 and multiplexors 1304 are controlled by the alignment flags and the scaling mode from decode circuit 1305, which implements equations 35–38.

It is not necessary to employ three Z-Engines to generate pre-interpolated coefficients. Note the overlap in FIG. 9 of e,f and the previous c,d coefficients. It is sufficient to have two Z-Engines for pre-interpolation with the addition of:

$$e_i = c_{i-1} \quad (39)$$

$$f_i = d_{i-1} \quad (40)$$

$$PS_{3i} = PS_{2i-1} \quad (41)$$

FIG. 4 shows an overview of this two Z-engine architecture.

The Pre-Interpolation Calculation

In pre-interpolation an input pixel can contribute to up to four output pixels. This requires two pending accumulators (A & B) and two result accumulators ($Q_A$ & $Q_B$).

$$Q'_A = K1 + A \quad (42)$$

$$Q'_B = \begin{cases} K2 + B & \text{if } PS_3 \\ K2 & \text{otherwise} \end{cases} \quad (43)$$

$$A = \begin{cases} K3 & \text{if } (PS_3 | PB_1) \& (PS_1 | PE_1) \\ K2 + B & \text{else if } PS_3 \\ K2 & \text{otherwise} \end{cases} \quad (44)$$

$$B2 = \begin{cases} K4 & \text{if } (PS_3 \& PS_1 \& PS_2) \\ K3 & \text{otherwise} \end{cases} \quad (45)$$

$$\text{Valid}_A = 1 \quad (46)$$

$$\text{Valid}_B = (PS_3 | PB_j) \& (PS_j | PE_j) \quad (47)$$

Extension to Two Dimensions

The same approach used for scaling down is used to extend scaling up to two dimensions: scaling up is performed in two stages, first processing pixels vertically, then passing the vertically weighted pixels on to be scaled horizontally. Each dimension has a separate Z-Engine and coefficient reduction complex. The vertical weighting calculation performed in circuit 1601 (see FIG. 16) becomes:

$$[K9 \ K10 \ K11 \ K12] = [C1_V \ C2_V \ C3_V \ C4_V] \cdot P_i \quad (48)$$

Similarly the horizontal weighting calculation performed in circuit 1602 (see FIG. 16) becomes:

$$[K1 \ K2 \ K3 \ K4] = [C1_H \ C2_H \ C3_H \ C4_H] \cdot PV_a \quad (49a)$$

$$[K5 \ K6 \ K7 \ K8] = [C1_H \ C2_H \ C3_H \ C4_H] \cdot PV_b \quad (49b)$$

Figure 14:
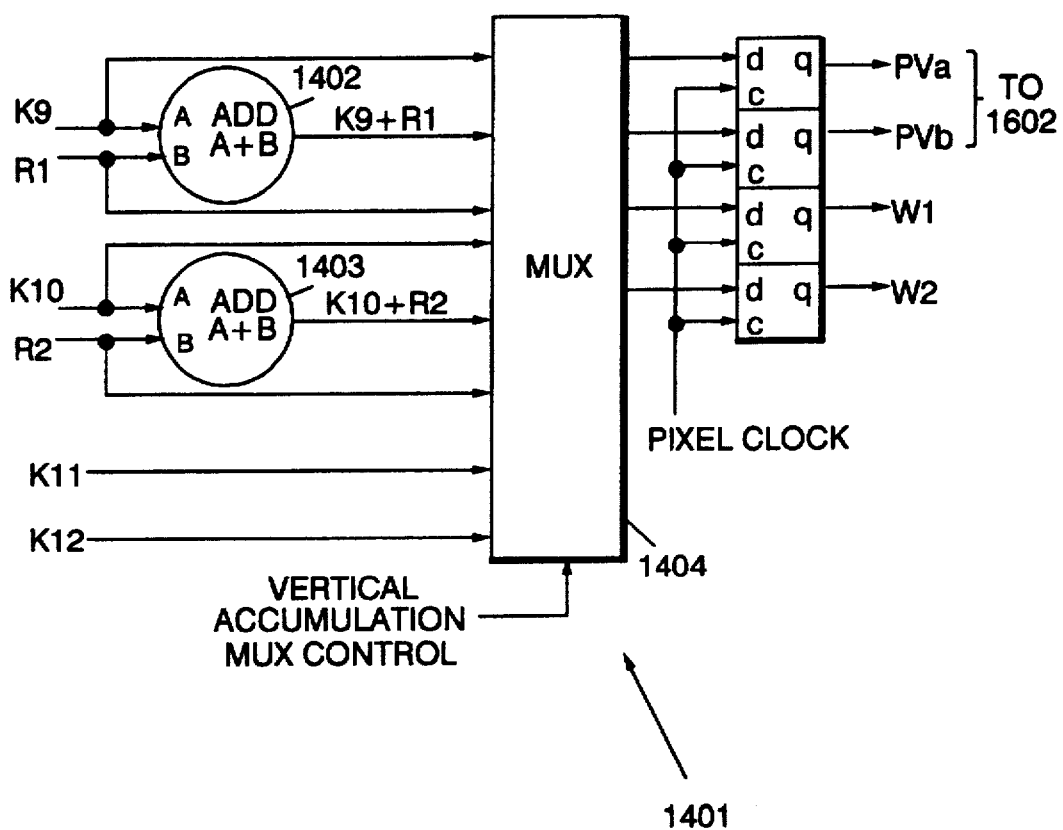
FIG. 14 illustrates a hardware configuration for vertical accumulation.

In the vertical dimension it is necessary to accumulate two partial pixels for each pixel of an input line, requiring a two line cache as wide as the widest input pixel line. FIG. 14 diagrams the converged vertical accumulation implementation. The inputs are the four partial pixels from the vertical weighting (multipliers) K9–K12, the two cache values which match this input pixel (R1 and R2) and the relevant steering controls derived from the pixel alignment flags. Two adders 1402, 1403 are used to generate terms K9+R1 and K10+R2. Four multiplexors 1404 each select from a subset among these six terms to generate two completed vertical partial pixels (PVa and PVb) to pass on to the horizontal section and two pending partial pixels (W1 and W2) to store in caches 1603, 1604 for retrieval on the next pixel line:

$$PV_a = K9 + R1 \tag{50}$$

$$PV_b = \begin{cases} K10 + R2 & \text{if } PS_3 \\ K10 & \text{otherwise} \end{cases} \tag{51}$$

$$W_1 = \begin{cases} K11 & \text{if } (PS_3 | PB_1) \& (PS_1 | PE_1) \\ K10 + R2 & \text{else if } PS_3 \\ K10 & \text{otherwise} \end{cases} \tag{52}$$

$$W_2 = \begin{cases} K12 & \text{if } (PS_3 \& PS_1 \& PS_2) \\ K11 & \text{otherwise} \end{cases} \tag{53}$$

Figure 15:
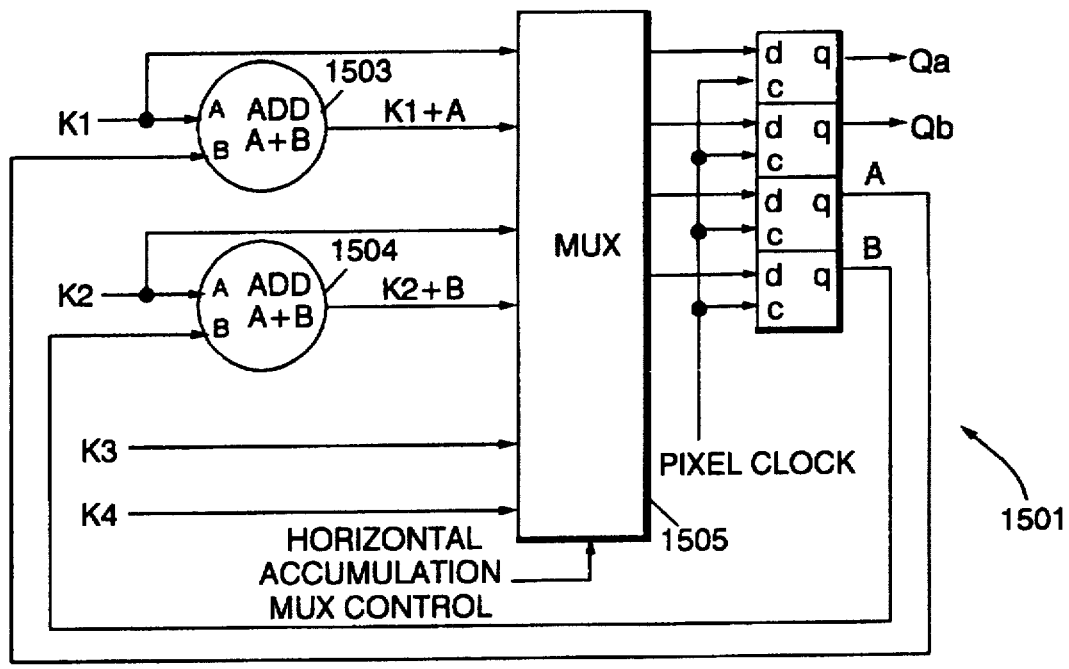
FIG. 15 illustrates a hardware configuration for horizontal accumulation.
Figure 15:
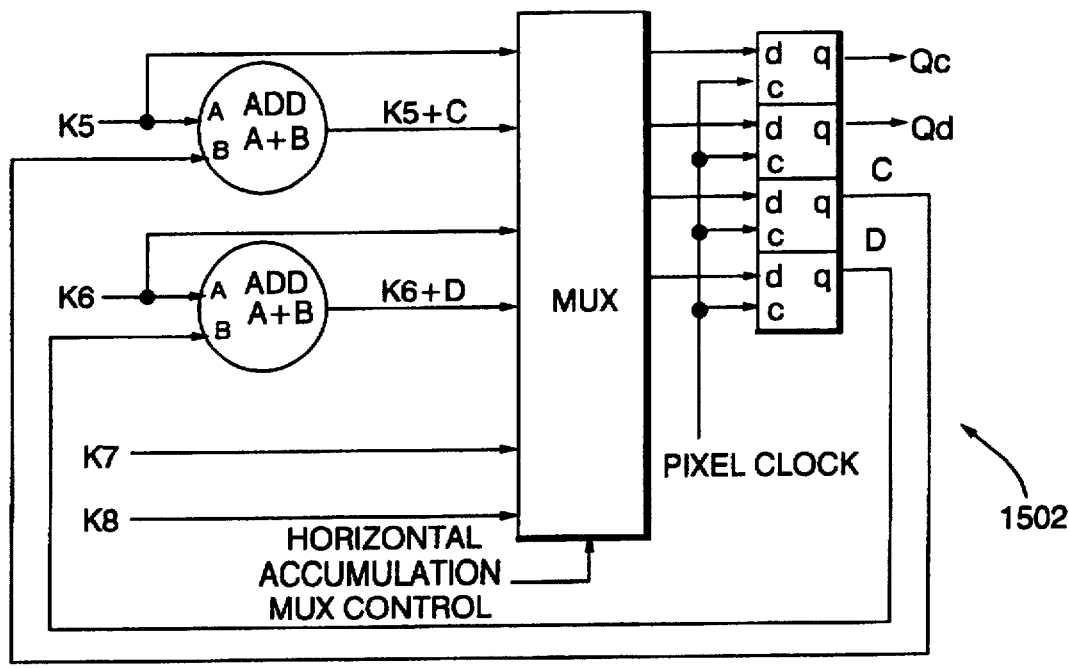

In the horizontal direction, because the vertical calculation can produce two completed pixels, it is necessary to have two copies of the horizontal accumulation logic. See FIG. 15 for an overview of the horizontal accumulation implementation, which diagrams the two converged horizonal accumulators 1501, 1502 (one for each of the two vertical partial pixel inputs) termed the upper and lower accumulators. Since they are identical, only one will be described. The inputs to the upper accumulator 1501 are the four partial pixels from the horizontal weighting (multipliers) K1–K4, the two pending accumulators (A and B) and the relevant steering controls derived from the horizontal pixel alignment flags. Two adders 1503, 1504 are used to generate accumulator terms K1+A and K2+B. Four multiplexors 1505 each select from a subset among these six terms to generate two completed output pixels (Qa and Qb) and two pending partial pixels (A and B), which are saved for the next input pixel:

$$Q'_A = K1 + A \tag{54}$$

$$Q_B = \begin{cases} K2 + B & \text{if } PS_3 \\ K2 & \text{otherwise} \end{cases} \tag{55}$$

$$A = \begin{cases} K3 & \text{if } (PS_3 | PB_1) \& (PS_1 | PE_1) \\ K2 + B & \text{else if } PS_3 \\ K2 & \text{otherwise} \end{cases} \tag{56}$$

$$B = \begin{cases} K4 & \text{if } (PS_3 \& PS_1 \& PS_2) \\ K3 & \text{otherwise} \end{cases} \tag{57}$$

Figure 16A:
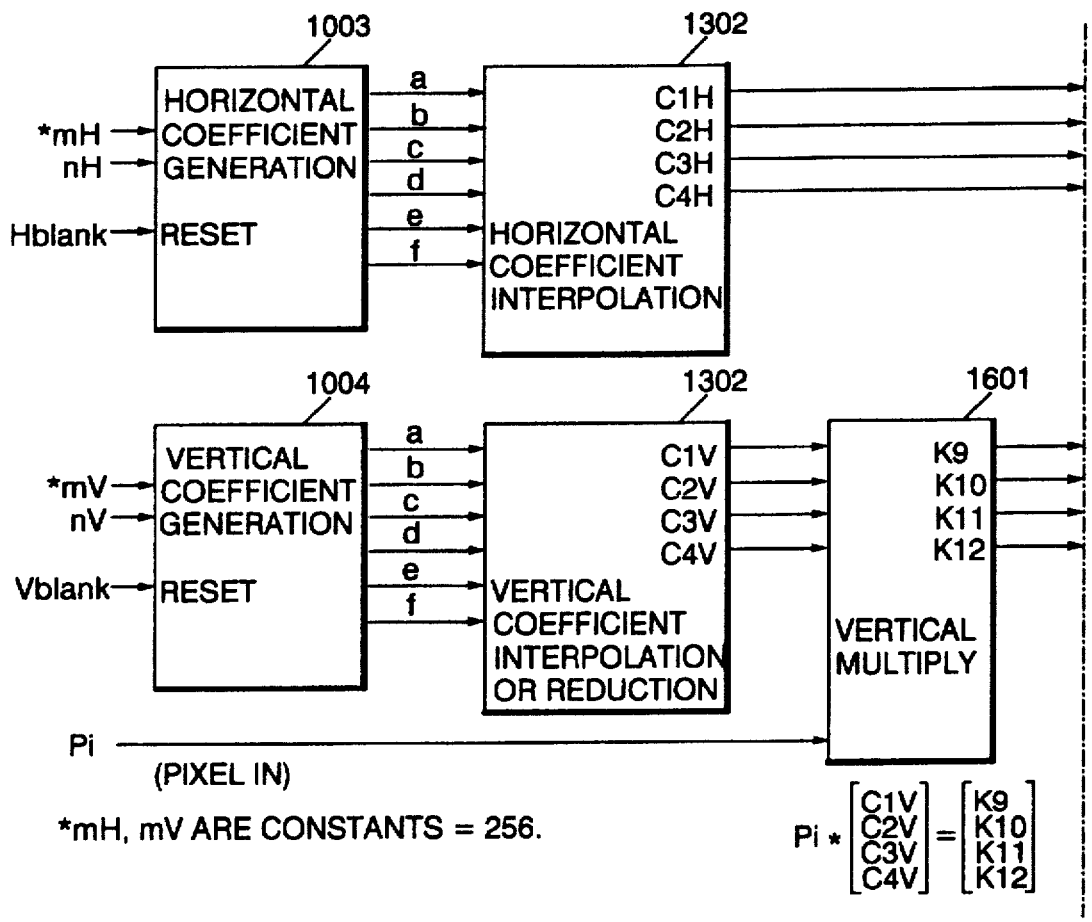
FIG. 16 illustrates a hardware configuration of converged scaling data flow for scale down and scale up.
Figure 16:
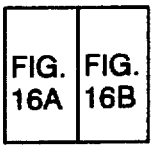
Figure 16B:
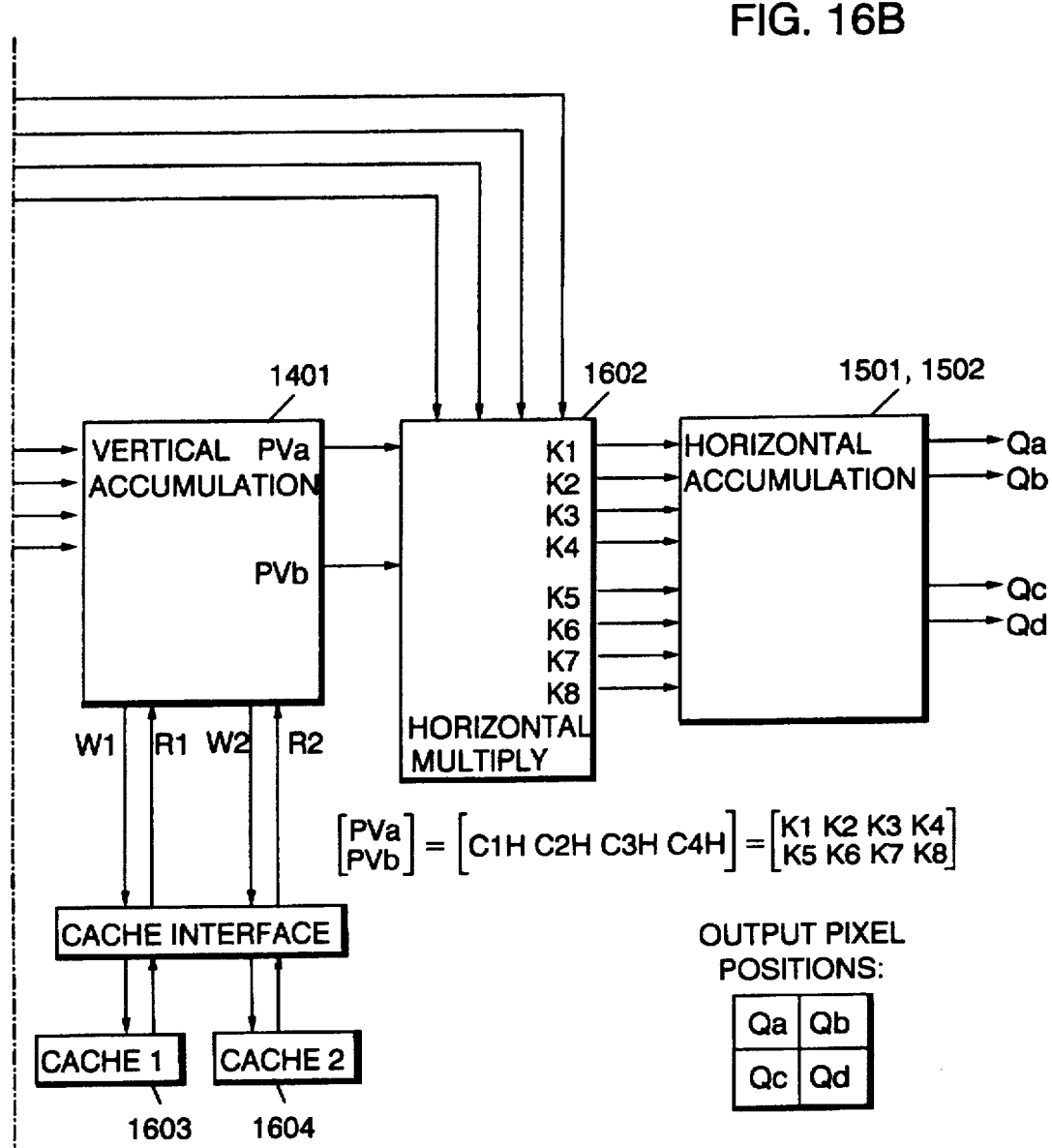

See also FIG. 16 for an overall data flow of the converged architecture, which combines the previous diagrams to show an overview of the data flow through the scaling algorithm as detailed in the previous Figures.

Boundary Conditions

With Pre-Interpolation we encounter the problem of boundary conditions. On the first pixel of a line and the first line of a field the previous pixel or line is not available. To replace this missing data the first pixel and line is logically replicated. For the two boundary overlay cases (i & vii) two adjustments need to be made to the algorithm. Because the inherited e and f coefficients are unknown at the boundary the coefficient interpolator is modified by:

$$C1 = \begin{cases} m & \text{if FIRST} \\ e/2 + (a + f/2) & \text{else if } PS_1 \& \overline{PS_3} \\ e/2 & \text{otherwise} \end{cases} \tag{58}$$

and there is no pending data the accumulator is modified by:

$$Q_A = \begin{cases} K1 & \text{if FIRST} \\ K1 + A & \text{otherwise} \end{cases} \tag{59}$$

Because the coefficient combination term (f/2+a) is included in the boundary cases it is also necessary to initialize f=0.

Figure 17:
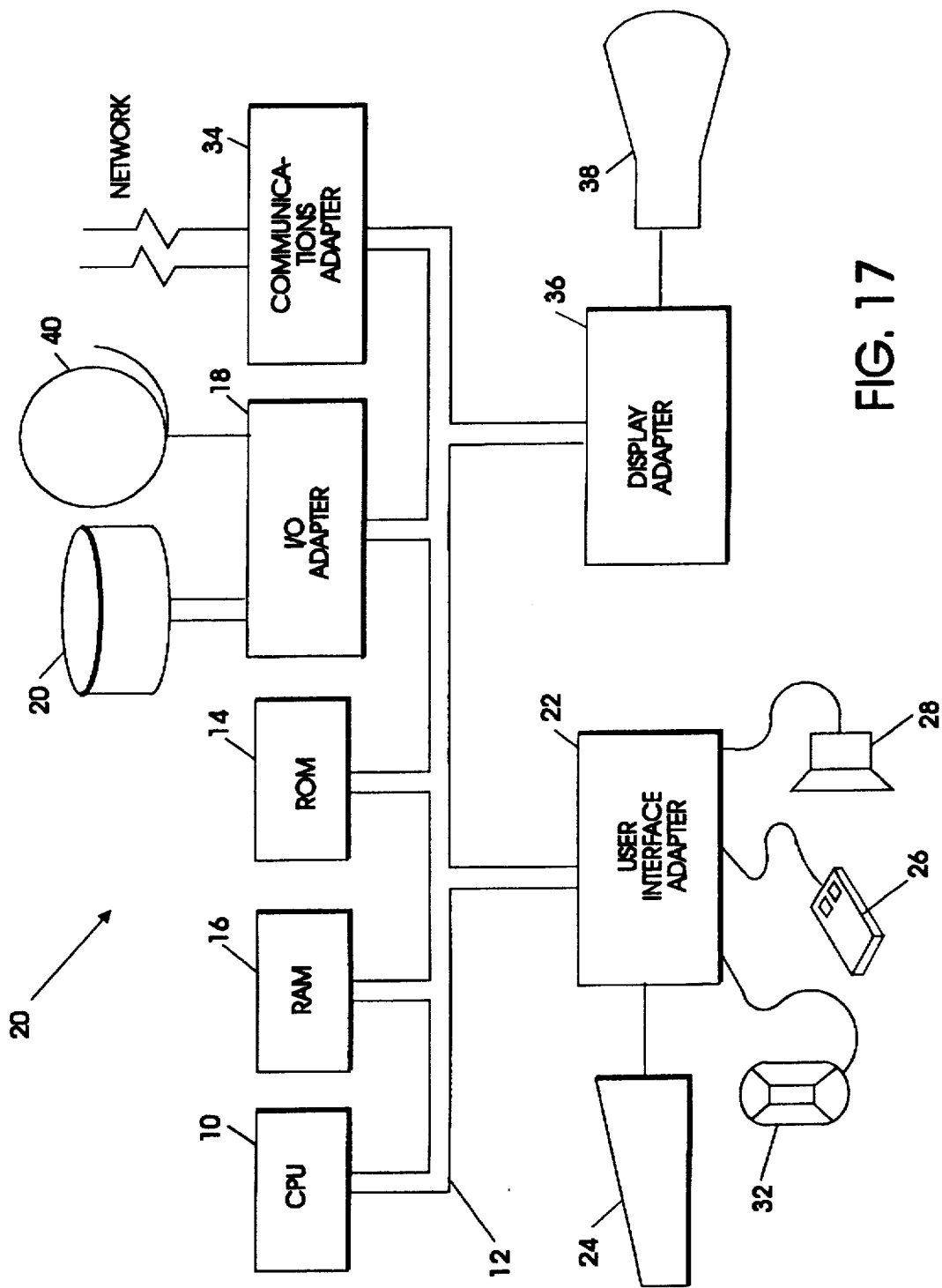
FIG. 17 illustrates a data processing system for implementing the present invention.

A representative hardware environment for practicing the present invention is depicted in FIG. 17, which illustrates a typical hardware configuration of a workstation in accordance with the subject invention having a central processing unit 10, such as a conventional microprocessor, and a number of other units interconnected via a system bus 12. The workstation shown in FIG. 16 includes a random access memory (RAM) 14, read only memory (ROM) 16, and input/output (I/O) adapter 18 for connecting peripheral devices such as disc units 20 and tape drives 40 to bus 12, user interface adapter 22 for connecting keyboard 24, mouse 26, speaker 28, microphone 32, and/or other user interface devices such as a touch screen device (not shown) to bus 12, communication adapter 34 for connecting the workstation to a data processing network, and display adapter 36 for connecting bus 12 to display device 38.

The present invention as depicted in FIGS. 6 and 16 may be implemented within adapter 36.

In practice, the Vertical Coefficient Generator iterates once for each line of a field (the coefficients and pixel flags are constant for pixels on that line) and the Horizontal Coefficient Generator iterates once for each pixel on a line. Because the Vertical and Horizontal Coefficient Generators are never in operation at the same time, we can use the common technique of multiplexing to share a single coefficient generator between the Vertical and Horizontal states. For the purposes of this disclosure, the details of this are not relevant.

Although the present invention and its advantages have been described in detail, it should be understood that various changes, substitutions and alterations can be made herein without departing from the spirit and scope of the invention as defined by the appended claims.

What is claimed is:

1. A system for scaling a video image, comprising:

means for generating coefficients in a vertical direction as a function of an area weighted average of contributions of input pixels to output pixels in said vertical direction and as a function of a scaling ratio of said input pixels to said output pixels in said vertical direction;

means for generating coefficients in a horizontal direction as a function of an area weighted average of contributions of input pixels to output pixels in said horizontal direction and as a function of a scaling ratio of said input pixels to said output pixels in said horizontal direction;

means for multiplying input pixels of said video image by said coefficients generated in said vertical direction as a function of an area weighted average of contributions of input pixels to output pixels in said vertical direction and as a function of said scaling ratio of said input pixels to said output pixels in said vertical direction, said multiplying of said input pixels of said video image by said coefficients generated in said vertical direction resulting in vertically scaled pixels;

means for multiplying said vertically scaled pixels by said coefficients generated in said horizontal direction as a function of an area weighted average of contributions of input pixels to output pixels in said horizontal direction and as a function of said scaling ratio of said input pixels to said output pixels in said horizontal direction resulting in vertically and horizontally scaled pixels; and wherein said means for generating coefficients in a vertical direction further comprises means for logically increasing said input pixels in said vertical direction.

2. A system for scaling a video image, comprising the steps of:

generating coefficients in a vertical direction as a function of an area weighted average of contributions of input pixels to output pixels in said vertical direction and as a function of a scaling ratio of said input pixels to said output pixels in said vertical direction;

generating coefficients in a horizontal direction as a function of an area weighted average of contributions of input pixels to output pixels in said horizontal direction and as a function of a scaling ratio of said input pixels to said output pixels in said horizontal direction;

multiplying input pixels of said video image by said coefficients generated in said vertical direction as a function of an area weighted average of contributions of input pixels to output pixels in said vertical direction and as a function of said scaling ratio of said input pixels to said output pixels in said vertical direction, said multiplying of said input pixels of said video image by said coefficients generated in said vertical direction resulting in vertically scaled pixels;

multiplying said vertically scaled pixels by said coefficients generated in said horizontal direction as a function of an area weighted average of contributions of input pixels to output pixels in said horizontal direction and as a function of said scaling ratio of said input pixels to said output pixels in said horizontal direction resulting in vertically and horizontally scaled pixels; and wherein said step of generating coefficients in a vertical direction further comprises the step of logically increasing said input pixels in said vertical direction.

3. A system for scaling a video image, comprising:

means for generating coefficients in a vertical direction as a function of an area weighted average of contributions of input pixels to output pixels in said vertical direction and as a function of a scaling ratio of said input pixels to said output pixels in said vertical direction;

means for generating coefficients in a horizontal direction as a function of an area weighted average of contributions of input pixels to output pixels in said horizontal direction and as a function of a scaling ratio of said input pixels to said output pixels in said horizontal direction;

means for multiplying input pixels of said video image by said coefficients generated in said vertical direction as a function of an area weighted average of contributions of input pixels to output pixels in said vertical direction and as a function of said scaling ratio of said input pixels to said output pixels in said vertical direction, said multiplying of said input pixels of said video image by said coefficients generated in said vertical direction resulting in vertically scaled pixels;

means for multiplying said vertically scaled pixels by said coefficients generated in said horizontal direction as a function of an area weighted average of contributions of input pixels to output pixels in said horizontal direction and as a function of said scaling ratio of said input pixels to said output pixels in said horizontal direction resulting in vertically and horizontally scaled pixels; and wherein said means for generating coefficients in a horizontal direction further comprises means for logically increasing said input pixels in said horizontal direction.

4. A method for scaling a video image, comprising the steps of:

generating coefficients in a vertical direction as a function of an area weighted average of contributions of input pixels to output pixels in said vertical direction and as a function of a scaling ratio of said input pixels to said output pixels in said vertical direction;

generating coefficients in a horizontal direction as a function of an area weighted average of contributions of input pixels to output pixels in said horizontal direction and as a function of a scaling ratio of said input pixels to said output pixels in said horizontal direction;

multiplying input pixels of said video image by said coefficients generated in said vertical direction as a function of an area weighted average of contributions of input pixels to output pixels in said vertical direction and as a function of said scaling ratio of said input pixels to said output pixels in said vertical direction, said multiplying of said input pixels of said video image by said coefficients generated in said vertical direction resulting in vertically scaled pixels;

multiplying said vertically scaled pixels by said coefficients generated in said horizontal direction as a function of an area weighted average of contributions of input pixels to output pixels in said horizontal direction and as a function of said scaling ratio of said input pixels to said output pixels in said horizontal direction resulting in vertically and horizontally scaled pixels; and wherein said step of generating coefficients in a horizontal direction further comprises the step of logically increasing said input pixels in said horizontal direction.

5. The system as recited in claim 1 or 2, wherein said coefficients generated in said vertical direction are also a function of an interpolation of said input pixels in said vertical direction.

6. The system as recited in claim 1 or 2, wherein said coefficients generated in said vertical direction are also a function of a duplication of said input pixels in said vertical direction.

7. The system as recited in claim 1 or 2, wherein said coefficients generated in said horizontal direction are also a function of an interpolation of said input pixels in said horizontal direction.

8. The system as recited in claim 1 or 2, wherein said coefficients generated in said horizontal direction are also a function of a duplication of said input pixels in said horizontal direction.

9. The system as recited in claim 1 or 2, wherein said means for generating coefficients in a horizontal direction iterates for each pixel on a line of said video image, resetting at horizontal retrace, said means for generating coefficients in a vertical direction iterating for each line of a field, resetting at vertical retrace.

10. The method as recited in claim 9 or 4, wherein said coefficients generated in said vertical direction are also a function of an interpolation of said input pixels in said vertical direction.

11. The method as recited in claim 9 or 4, wherein said coefficients generated in said vertical direction are also a function of a duplication of said input pixels in said vertical direction.

12. The method as recited in claim 9 or 4, wherein said coefficients generated in said horizontal direction are also a function of an interpolation of said input pixels in said horizontal direction.

13. The method as recited in claim 9 or 4, wherein said coefficients generated in said horizontal direction are also a function of a duplication of said input pixels in said horizontal direction.

14. The method as recited in claim 9 or 4, wherein said step of generating coefficients in a horizontal direction iterates for each pixel on a line of said video image, resetting at horizontal retrace, said step for generating coefficients in a vertical direction iterating for each line of a field, resetting at vertical retrace.

15. The method as recited in claim 4, wherein said step of generating coefficients in a horizontal direction further comprises the step of logically doubling said input pixels in said horizontal direction.

16. The method as recited in claim 2, wherein said step of generating coefficients in a vertical direction further comprises the step of logically doubling said input pixels in said vertical direction.

17. The system as recited in claim 1, wherein said means for generating coefficients in a vertical direction further comprises means for logically doubling said input pixels in said vertical direction.

18. The system as recited in claim 3, wherein said means for generating coefficients in a horizontal direction further comprises means for logically doubling said input pixels in said horizontal direction.

* * * * *